C. M. Day,
Circular Saw-Mill,
Nº 13,028.    Patented June 12, 1855.
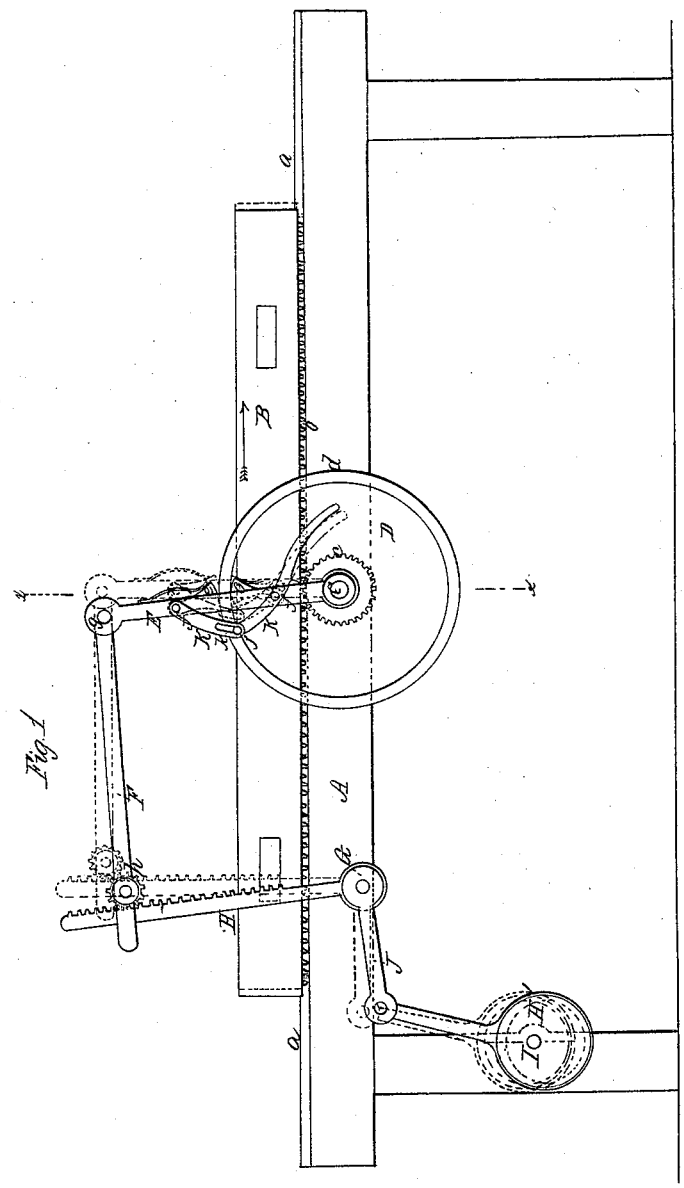
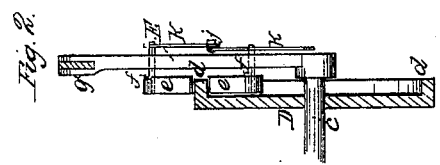

UNITED STATES PATENT OFFICE.

CHARLES M. DAY, OF NEW YORK, N. Y.

FEED-MOTION FOR SAWMILLS, &c.

Specification of Letters Patent No. 13,028, dated June 12, 1855.

*To all whom it may concern:*

Be it known that I, CHARLES M. DAY, of the city, county, and State of New York, have invented a new and Improved Device for Giving the Necessary Feed-Motion to Sawmills, Planing-Machines, &c.; and I do hereby declare that the following is a full, clear, and exact description of the same, reference being had to the annexed drawings, making a part of this specification, in which—

Figure 1, is a side view of my improvement. Fig. 2, is a vertical section of the clamps and pulley, $x$, $x$, Fig. 1, shows the plane of section.

Similar letters of reference indicate corresponding parts in the two figures.

The nature of my invention consists in the employment or use of clamps attached to a lever, and operating upon a pulley as will be hereafter shown, in combination with a lever having a vibrating motion communicated to it by means of an arm, which fits on a vertical rack attached to a rock shaft, the rack gearing in a pinion attached to the arm of the lever. The rock shaft being operated by an eccentric, as will be hereafter described.

To enable others skilled in the art to fully understand and construct my invention, I will proceed to describe it.

A represents a framing on the upper part of which a carriage B, works on suitable guides or ways ($a$). The under side of the carriage has a rack ($b$) attached to it in which a pinion ($c$) gears, said pinion being hung on a transverse shaft C, having its bearings in the frame A. Two pinions and racks may be employed, if desired, both pinions being on the same shaft C, and a rack at each side of the carriage B.

To one end of the shaft C, a pulley D, is attached, said pulley having a projecting rim ($d$) shown clearly in Fig. 2, and on the shaft C, adjoining the pulley D, the lower end of a lever E, is fitted loosely. The lever E, has two clamps ($e$), ($e$), attached to it by pivots ($f$), the lower end of the upper clamp bearing upon the outer edge of the rim ($d$) of the pulley D, and the upper end of the lower clamp bearing against the inner edge of the rim ($d$), see Fig. 2. The ends of the clamps ($e$), ($e$), are somewhat curved as shown in Fig. 1. The upper end of the lever E, is connected by a pivot ($g$) to one end of an arm F. The opposite end of the arm F, is slotted and has a pinion ($h$) fitted within it, see Fig. 1.

G, is a rock shaft working in suitable bearings in the framing A. To this shaft a vertical rack H is attached, said rack passing through the slotted end of the arm F, and gearing in the pinion ($h$) see Fig. 1.

$H^1$, is an eccentric attached to a shaft I. This eccentric is connected to an arm J, attached to the rock shaft G.

K, K, are two levers, which are attached to the pivots ($f$) ($f$). The inner ends of these levers are connected by a pin and slot, the pin ($j$) being attached to one lever and fitting in the slot ($k$) in the other.

The operation will be readily understood. Motion is given the shaft I in any proper manner and the eccentric $H^1$, and arm J, communicate a rocking motion to the shaft G, and a reciprocating motion is given the rack H and this motion is communicated to the lever E, by the arm F, and as the lever E vibrates, the clamps ($e$), ($e$), bind against the rim ($d$) during its forward movement and rotate the pulley D, and as the pinion ($c$) gears into the rack ($b$) the carriage B, is moved a certain distance in the direction indicated by the arrow. Upon the backward movement of the lever E, the clamps ($e$), ($e$), do not bind against the rim ($d$) of the pulley D, but slip upon it. The length of the vibration of the lever E, may be increased or diminished by raising or lowering the end of the arm F, on the rack H, and consequently the feed may be increased or diminished as desired. The carriage is gigged back by releasing the clamps from the pulley D, by operating the levers K, K.

I do not claim the clamps, ($e$), ($e$), separately, but what I do claim as new and desire to secure by Letters Patent, is—

1. The clamps ($e$), ($e$), attached to a lever E, and working upon a pulley D, in combination with the rack H, and pinion ($h$) attached to the arm F, the above parts being arranged, constructed, and operated as herein shown and described.

2. I also claim the levers K, K, attached to the pivots ($f$) ($f$) of the clamps and connected by the pin $j$ and slot ($k$) at their inner ends, for the purpose of relieving the clamps from the pulley D, when the carriage is gigged back.

CHARLES M. DAY.

Witnesses:
   J. W. COOMBS,
   JOS. GEO. MASON.